(12) United States Patent
Fukawatase et al.

(10) Patent No.: US 7,578,517 B2
(45) Date of Patent: Aug. 25, 2009

(54) KNEE AIRBAG DEVICE

(75) Inventors: Osamu Fukawatase, Nishikamo-gun (JP); Tomoyuki Moro, Toyota (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 11/979,328

(22) Filed: Nov. 1, 2007

(65) Prior Publication Data

US 2008/0106078 A1 May 8, 2008

(30) Foreign Application Priority Data

Nov. 2, 2006 (JP) ............................. 2006-299248

(51) Int. Cl.
*B60R 21/203* (2006.01)
(52) U.S. Cl. .................. 280/730.1; 280/731; 280/743.2
(58) Field of Classification Search ............... 280/730.1, 280/731, 743.1, 743.2, 750, 751, 752
See application file for complete search history.

(56) References Cited

U.S. PATENT DOCUMENTS

| | | | |
|---|---|---|---|
| 5,570,901 A | 11/1996 | Fyrainer | |
| 6,715,789 B2 * | 4/2004 | Takimoto et al. | 280/730.1 |
| 6,752,417 B2 * | 6/2004 | Takimoto et al. | 280/730.1 |
| 6,942,245 B2 * | 9/2005 | Takimoto et al. | 280/730.1 |
| 6,945,557 B2 * | 9/2005 | Takimoto et al. | 280/730.1 |
| 7,055,851 B2 * | 6/2006 | Takimoto et al. | 280/730.1 |
| 7,055,858 B2 * | 6/2006 | Takimoto et al. | 280/743.1 |
| 7,182,365 B2 * | 2/2007 | Takimoto et al. | 280/730.1 |
| 7,201,395 B2 * | 4/2007 | Nagata et al. | 280/730.1 |
| 7,213,834 B2 * | 5/2007 | Mizuno et al. | 280/730.1 |
| 7,226,075 B2 * | 6/2007 | Nagata et al. | 280/731 |
| 7,232,149 B2 * | 6/2007 | Hotta et al. | 280/730.1 |
| 7,350,801 B2 * | 4/2008 | Nakayama | 280/730.1 |
| 7,370,879 B2 * | 5/2008 | Hotta et al. | 280/728.2 |
| 7,377,541 B2 * | 5/2008 | Abe et al. | 280/730.1 |
| 7,384,065 B2 * | 6/2008 | Takimoto et al. | 280/732 |
| 7,434,837 B2 * | 10/2008 | Hotta et al. | 280/743.2 |

(Continued)

FOREIGN PATENT DOCUMENTS

JP          A 8-301054          11/1996

(Continued)

*Primary Examiner*—Christopher P Ellis
*Assistant Examiner*—Laura Freedman
(74) *Attorney, Agent, or Firm*—Oliff & Berridge, PLC

(57) ABSTRACT

A knee airbag device includes a knee airbag that is disposed in a folded state inside a steering column cover. When the knee airbag receives gas, the knee airbag is inflated and deployed from the inside of the steering column cover toward the knee portion of an occupant. The knee airbag includes an instrument panel-side foundation cloth positioned close to an instrument panel when the knee airbag is deployed, an occupant-side foundation cloth positioned close to the occupant when the knee airbag is deployed, and a first strap and a second strap that connect the instrument panel-side foundation cloth and the occupant-side foundation cloth. When the knee airbag is deployed, the first strap is positioned above the second strap and the length of the first strap in a vehicle-longitudinal direction is set to be larger than the length of the second strap in the vehicle-longitudinal direction.

2 Claims, 3 Drawing Sheets

U.S. PATENT DOCUMENTS

| | | | |
|---|---|---|---|
| 2007/0045998 A1* | 3/2007 | Kashiwagi | 280/730.1 |
| 2007/0182134 A1* | 8/2007 | Mizuno et al. | 280/730.1 |
| 2008/0100042 A1* | 5/2008 | Adachi et al. | 280/730.1 |
| 2008/0106079 A1* | 5/2008 | Fukawatase et al. | 280/730.1 |
| 2008/0111353 A1* | 5/2008 | Fukawatase et al. | 280/730.1 |
| 2008/0116669 A1* | 5/2008 | Adachi et al. | 280/730.1 |
| 2008/0122204 A1* | 5/2008 | Fukawatase et al. | 280/728.3 |
| 2008/0122205 A1* | 5/2008 | Imamura et al. | 280/730.1 |
| 2008/0211212 A1* | 9/2008 | Adachi et al. | 280/731 |
| 2008/0217890 A1* | 9/2008 | Fukawatase et al. | 280/731 |

FOREIGN PATENT DOCUMENTS

| | | |
|---|---|---|
| JP | A 9-104317 | 4/1997 |
| JP | A 9-123863 | 5/1997 |
| JP | A 10-71911 | 3/1998 |
| JP | B2 2759065 | 3/1998 |
| JP | A 2001-106013 | 4/2001 |
| JP | A 2002-37003 | 2/2002 |
| JP | A-2002-046562 | 2/2002 |
| JP | A-2003-205816 | 7/2003 |
| JP | A-2005-178607 | 7/2005 |
| JP | B2 3752920 | 12/2005 |
| JP | B2 3760424 | 1/2006 |

* cited by examiner

KNEE AIRBAG DEVICE

INCORPORATION BY REFERENCE

The disclosure of Japanese Patent Application No. 2006-299248 filed on Nov. 2, 2006 including the specification, drawings and abstract is incorporated herein by reference in its entirety.

BACKGROUND OF THE INVENTION

1. Field of the Invention

The invention relates to a knee airbag device.

2. Description of the Related Art

Japanese Patent Application Publication No. 9-123862 (JP-A-9-123862) describes a knee airbag device disposed in an instrument panel undercover, or in a steering column cover. When the airbag of the airbag device is deployed, the airbag extends to areas on the right and left sides of the steering column cover to regulate movement of the airbag in a vehicle-width direction.

However, in the above-described conventional example, the airbag is likely to be deployed in substantially parallel with the axis of the steering column due to the influence of the shape of the steering column cover. Thus, it is difficult to stably deploy the airbag at a desired position.

SUMMARY OF THE INVENTION

The invention makes it possible to stably deploy a knee airbag of a knee airbag device in substantially parallel with the surface of an instrument panel, which is positioned in front of a knee of an occupant.

A first aspect of the invention relates to a knee airbag device that includes a knee airbag that is disposed in a folded state inside a steering column cover. When the knee airbag receives gas, the knee airbag is inflated and deployed from the inside of the steering column cover toward the knee portion of an occupant. The knee airbag includes an instrument panel-side foundation cloth positioned close to an instrument panel when the knee airbag is deployed, an occupant-side foundation cloth positioned close to the occupant when the knee airbag is deployed, and a first strap and a second strap that connect the instrument panel-side foundation cloth and the occupant-side foundation cloth. The first strap is positioned above the second strap in a vehicle-height direction when the knee airbag is deployed. The length of the first strap in a vehicle-longitudinal direction is set to be larger than the length of the second strap in the vehicle-longitudinal direction when the knee airbag is deployed.

According to the above-described aspect, the knee airbag includes the first strap and the second strap that connect the instrument panel-side foundation cloth and the occupant-side foundation cloth. The first strap is positioned above the second strap in the vehicle-height direction when the knee airbag is deployed. The length of the first strap in the vehicle-longitudinal direction is set to be larger than the length of the second strap in the vehicle-longitudinal direction when the knee airbag is deployed. Therefore, when the knee airbag restrains the knee portion of the occupant, the knee airbag is deployed such that the front portion or the upper portion of the knee airbag extends along the surface of the instrument panel, which is positioned in front of the knee of the occupant. Thus, it is possible to stably deploy the knee airbag in substantially parallel with the surface of the instrument panel, which is positioned in front of the knee of the occupant.

In the above-described aspect, a difference between the length of the first strap in the vehicle-longitudinal direction and the length of the second strap in the vehicle-longitudinal direction may be set according to an angle formed between the surface of the instrument panel, which is positioned in front of the knee of the occupant, and the axis of the steering column in the lateral view of the vehicle.

According to the above-described aspect, a difference between the length of the first strap in the vehicle-longitudinal direction and the length of the second strap in the vehicle-longitudinal direction is set according to the angle formed between the surface of the instrument panel, which is positioned in front of the knee of the occupant, and the axis of the steering column in the lateral view of the vehicle. Therefore, it is possible to stably deploy the knee airbag in substantially parallel with the surface of the instrument panel, which is positioned in front of the knee of the occupant, regardless of the angle.

In the above-described aspect, a cut-out portion may be formed in the first strap at a front portion that faces the steering column cover when the knee airbag is deployed.

According to the above-described aspect, the cut-out portion is formed in the first strap at the front portion that faces the steering column cover when the knee airbag is deployed. Therefore, it is possible to deploy the knee airbag while suppressing interference between the knee airbag and the steering column cover. This reduces the influence of the steering column cover when the knee airbag is deployed. Thus, it is possible to stably deploy the knee airbag in substantially parallel with the surface of the instrument panel, which is positioned in front of the knee of the occupant.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Figure 1:
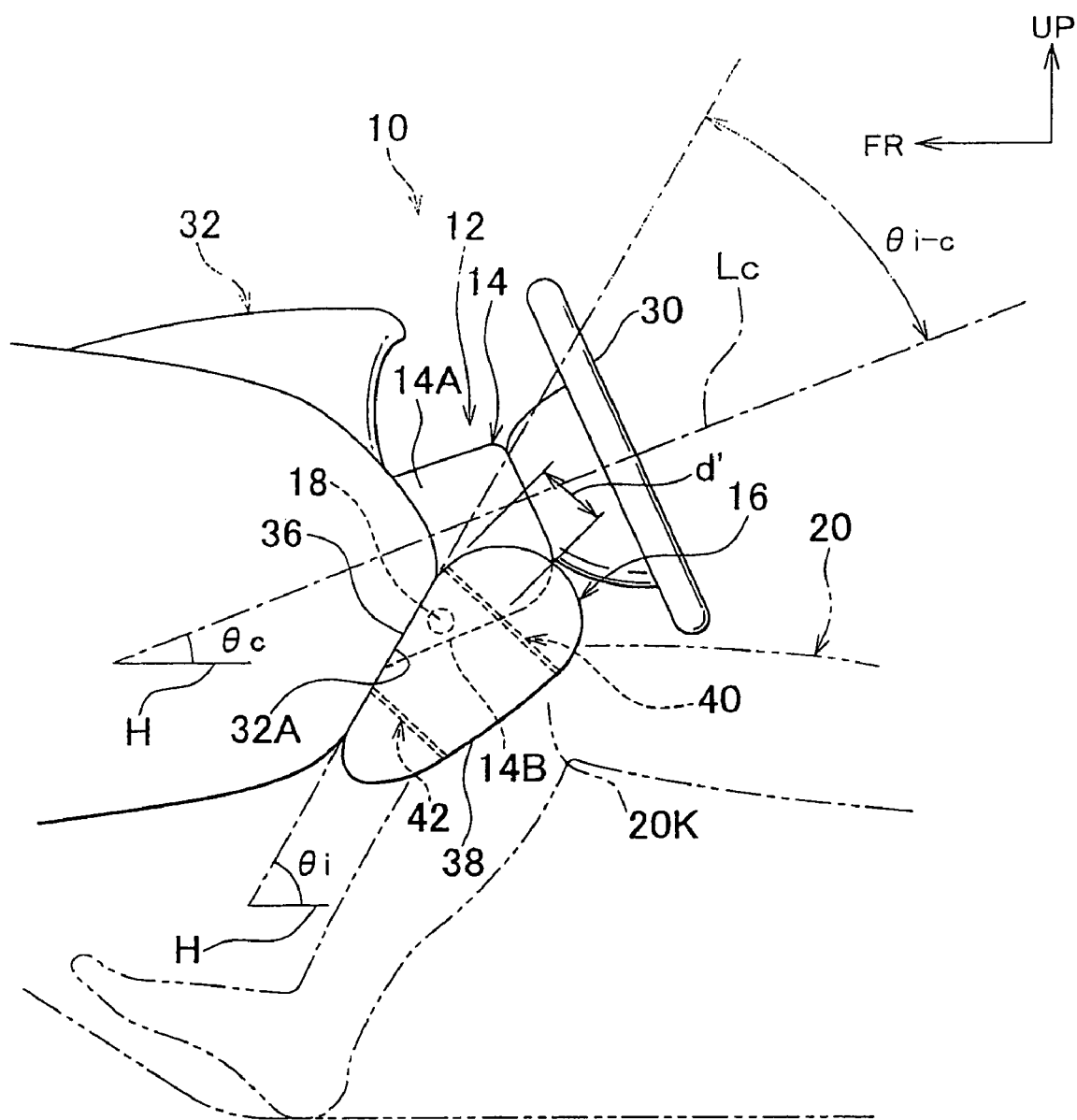
FIG. 1 is a lateral view showing a situation where a knee airbag of a knee airbag device is deployed along the surface of an instrument panel, which is positioned in front of a knee of an occupant, and the knee airbag restrains the knee portion of the occupant.
Figure 2:
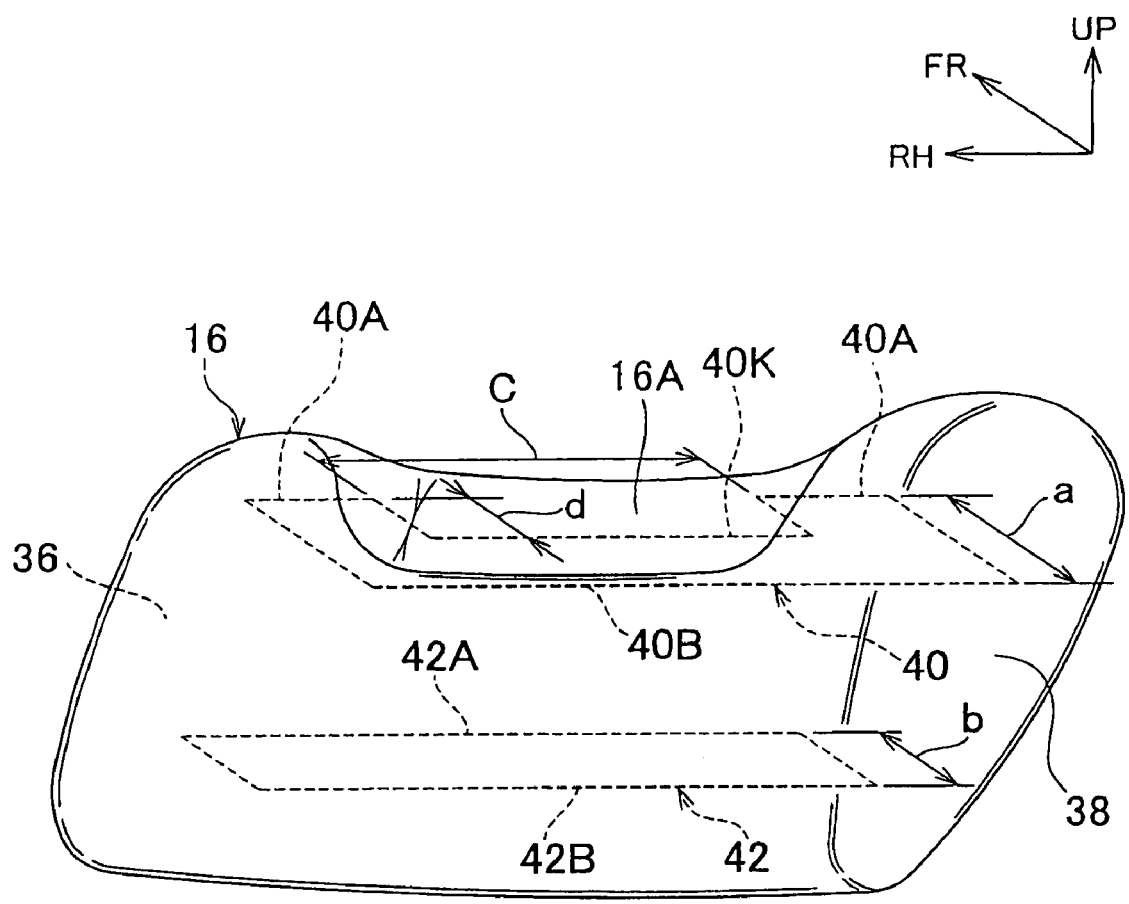
FIG. 2 is an enlarged perspective view showing the deployed knee airbag, which is diagonally viewed from the rear of the vehicle.
Figure 3:
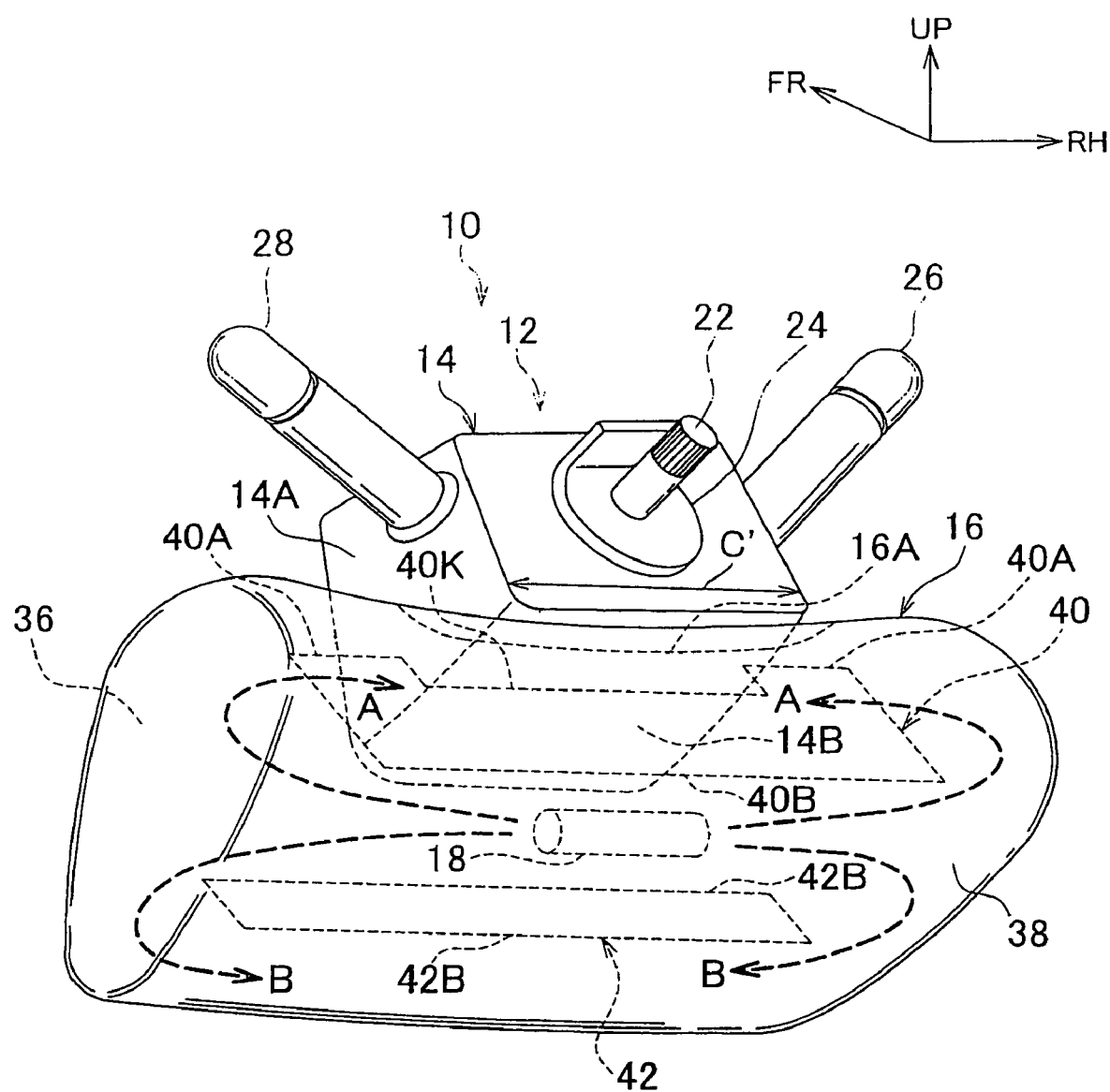
FIG. 3 is an enlarged perspective view showing the knee airbag that is deployed while interference between the knee airbag and a steering column cover is suppressed when the knee airbag receives gas from an inflator.

Hereinafter, an embodiment of the invention will be described with reference to the drawings. In FIG. 1 to FIG. 3, the arrow FR indicates the front of a vehicle and the arrow UP indicates the top of the vehicle. In FIG. 1, a knee airbag device 10 according to the embodiment includes a knee airbag 16. The knee airbag 16 is disposed in a folded state inside a steering column cover 14 that covers a steering column 12. For example, when the knee airbag 16 receives gas supplied from an inflator 18, the knee airbag 16 is inflated and deployed toward the knee portion 20K of an occupant 20 to restrain the knee portion 20K.

In FIG. 3, a steering column 12 includes a steering main shaft 22 and a column tube 24. The steering main shaft 22 is disposed in the core of the steering column 12. The column tube 24, which covers the steering main shaft 22, is supported by a vehicle body. The steering column 12 is inserted through an opening portion (not shown) formed in an instrument panel 32. The steering column 12 protrudes from the instrument panel 32 toward the rear of a vehicle (refer to FIG. 1). The above-described steering column 12 is covered by the steering column cover 14. Levers 26 and 28 protrude from the side surfaces 14A of the steering column cover 14. The levers 26 and 28 are used to operate a direction indicator, a wiper, and the like (not shown). As shown in FIG. 1, a steering wheel 30 is attached to the end of the steering main shaft 22 shown in FIG. 3. The steering wheel 30 is used to steer the vehicle.

As shown in FIG. 1, in the lateral view of the vehicle, the lower surface 14B of the steering column cover 14 extends in substantially parallel with the axis Lc of the steering column 12. An airbag module (not shown) is stored inside the steering column cover 14. The airbag module includes the knee airbag 16 in the folded state, and the inflator 18 that supplies the gas to the knee airbag 16 to deploy the knee airbag 16. The inflator 18 is operated by ignition current supplied from an airbag ECU (not shown). When the knee airbag 16, which receives the gas from the inflator 18, is inflated and deployed, an airbag door (not shown) provided in the steering column cover 14 is opened due to deployment pressure of the knee airbag 16. As a result, an opening portion is formed by opening the airbag door, and the knee airbag 16 protrudes from the opening portion into a vehicle cabin.

In FIG. 1, the knee airbag 16 is formed to have a bag shape, by sewing an instrument panel-side foundation cloth 36 and an occupant-side foundation cloth 38 together. When the knee airbag 16 is deployed, the instrument panel-side foundation cloth 36 is positioned close to the instrument panel 32, and the occupant-side foundation cloth 38 is positioned close to the occupant 20. For example, straps 40 and 42 are provided inside the knee airbag 16. The straps 40 and 42 connect the instrument panel-side foundation cloth 36 and the occupant-side foundation cloth 38. As shown in FIG. 2, when the knee airbag 16 is deployed, the strap 40 is disposed at an upper position and the strap 42 is disposed at a lower position, and the length "a" of the strap 40 in a vehicle-longitudinal direction (hereinafter, the length will be simply referred to as "width") is set to be larger than the width "b" of the strap 42. That is, the width "a" is larger than the width "b" (a>b). In FIG. 1, the surface 32A of the instrument panel 32 is positioned in front of the knee portion 20K of the occupant 20. For example, the surface 32A is inclined toward the front of the vehicle in a direction from a position near the steering column 12 toward the bottom of the vehicle.

In the lateral view of the vehicle shown in FIG. 1, an angle θi is formed between a horizontal surface H and the surface 32A of the instrument panel 32. An angle θc is formed between the horizontal surface H and the axis Lc of the steering column 12. The difference between the width "a" of the strap 40 and the width "b" of the strap 42 is set according to the difference between the angle θi and the angle θc, that is, an angle θi-c formed between the surface 32A of the instrument panel 32 and the axis Lc of the steering column 12. More specifically, when the difference between the angle θi and the angle θc is relatively large, the difference between the width "a" and the width "b" is set to be large. When the difference between the angle θi and the angle θc is relatively small, the difference between the width "a" and the width "b" is set to be small. This is because as the difference between the angle θi and the angle θc, i.e., the angle θi-c becomes larger, the distance between the upper instrument panel-side portion of the knee airbag 16, which contacts the surface 32A, and the steering column 12 becomes larger. When the steering column 12 is tiltable, and therefore the angle θc varies in a predetermined range, the width "a" of the strap 40 is set, for example, using the average of the angle θc.

In FIG. 3, the upper strap 40 is positioned below the steering column cover 14 when the knee airbag 16 is deployed. A cut-out portion 40K is formed in the strap 40 at a front portion or an upper portion that faces the steering column cover. More specifically, in the embodiment, because the strap 40 is positioned bellow the steering column cover 14 when the knee airbag 16 is deployed, the cut-out portion 40K is formed in the front portion or the upper portion of the strap 40, for example, at the center position in the vehicle-width direction as shown in FIG. 2 so that the knee airbag 16 is deployed while the interference between the knee airbag 16 and the steering column cover 14 is suppressed. The length "c" of the cut-out portion 40K in the vehicle-width direction is set according to the length "c'" of the steering column cover 14 in the vehicle-width direction (FIG. 3). The length "d" of the cut-out portion 40K in the vehicle-longitudinal direction is set according to the distance "d'" (FIG. 1) between the lower surface 14B of the steering column cover 14 and the surface 32A of the instrument panel 32, in the direction of the width of the strap 40.

As shown in FIG. 2, the instrument panel-side edge 40A and the cut-out portion 40K of the strap 40 are sewn to the instrument panel-side foundation cloth 36. The occupant-side edge 40B of the strap 40 is sewn to the occupant-side foundation cloth 38. Because the cut-out portion 40K of the strap 40 regulates the shape of the deployed knee airbag 16, a recessed portion 16A is formed in the front portion or the upper portion of the deployed knee airbag 16. Thus, by forming the recessed portion 16A, it is possible to deploy the knee airbag 16 while suppressing the interference between the knee airbag 16 and the steering column cover 14. The instrument panel-side edge 42A of the lower strap 42 is sewn to the instrument panel-side foundation cloth 36, and the occupant-side edge 42B of the strap 42 is sewn to the occupant-side foundation cloth 38. Thus, the strap 42 regulates the shape of the lower portion of the deployed knee airbag 16.

In FIG. 3, the right and left edges of the straps 40 and 42 in the vehicle-width direction are not sewn to the instrument panel-side foundation cloth 36 nor to the occupant-side foundation cloth 38. Therefore, when the gas is supplied, for example, into a portion between the straps 40 and 42, the gas flows through the spaces beside the right and left edges of the strap 40 in the vehicle-width direction toward the upper portion of the knee airbag 16 in the direction shown by the arrow A. In addition, the gas flows through the spaces beside the right and left edges of the strap 42 toward the lower portion of the knee airbag 16 in the direction shown by the arrow B. The cut-out portion 40K formed in the strap 40 functions as a gas passage through which the gas flows upward in the knee airbag 16.

In FIG. 3, the inflator 18 is disposed between the straps 40 and 42 to clearly show the inflator 18 and the flow of gas. However, the inflator 18 is actually positioned inside the steering column cover 14 as shown in FIG. 1. Also, the arrangement and the shapes of the straps 40 and 42 are not limited to those shown in FIGS. 1 to 3.

[Advantageous effects] In the embodiment, the knee airbag device 10 has the above-described configuration. Hereinafter, the advantageous effects of the knee airbag device 10 will be described. In FIG. 1, when the vehicle has a frontal collision, and the airbag ECU (not shown) determines that the vehicle has a frontal collision, the airbag ECU supplies the ignition current to the inflator 18, and the inflator 18 is operated to supply a large amount of gas to the knee airbag 16 in the folded state in the knee airbag device 10. Then, the airbag door (not shown) in the steering column cover 14 is opened due to the deployment pressure of the knee airbag 16. As a result, the knee airbag 16 is inflated and deployed from an opening portion formed by opening the airbag door, toward the vehicle cabin as shown in FIG. 1. Thus, the knee airbag 16 restrains the knee portion 20K of the occupant 20.

As shown in FIG. 3, in the process in which the knee airbag 16 is inflated and deployed, the gas is supplied from the inflator 18, for example, into a portion between the straps 40 and 42. The gas flows through the spaces beside the right and left edges of the strap 40 in the vehicle-width direction toward the upper portion of the knee airbag 16 in the direction shown by the arrow A. In addition, the gas flows through the spaces beside the right and left edges of the strap 42 toward the lower portion of the knee airbag 16 in the direction shown by the arrow B. Thus, the both end portions of the knee airbag 16 in the vehicle-width direction, which are positioned ahead of the knee portion 20K of the occupant 20 (FIG. 1), are quickly deployed. This improves the performance of restraining the knee portion 20K.

As shown in FIG. 2, in the knee airbag device 10, the straps 40 and 42 connect the instrument panel-side foundation cloth 36 and the occupant-side foundation cloth 38 of the knee airbag 16, and the width "a" of the strap 40, which is disposed at the upper position when the knee airbag 16 is deployed, is set to be larger than the width "b" of the strap 42, which is disposed at the lower position when the knee airbag 16 is deployed. Therefore, as shown in FIG. 1, when the knee airbag 16 restrains the knee portion 20K of the occupant 20, the knee airbag 16 is deployed such that the upper portion of the knee airbag 16 extends along the surface 32A of the instrument panel 32.

The difference between the width "a" of the strap 40 and the width "b" of the strap 42 (refer to FIG. 2) is set according to the difference between the angle $\theta i$ (i.e., the angle formed between the horizontal surface H and the surface 32A in the lateral view of the vehicle) and the angle $\theta c$ (i.e., the angle formed between the horizontal surface H and the axis Lc of the steering column 12 in the lateral view of the vehicle). When the difference between the angle $\theta i$ and the angle $\theta c$ is relatively large, the difference between the width "a", of the strap 40 and the width "b" of the strap 42 is set to be large. When the difference between the angle $\theta i$ and the angle $\theta c$ is relatively small, the difference between the width "a" of the strap 40 and the width "b" of the strap 42 is set to be small. Therefore, it is possible to stably deploy the knee airbag 16 in substantially parallel with the surface 32A of the instrument panel 32, regardless of the difference in the angle ($\theta i$-c).

As shown in FIG. 3, in the knee airbag device 10, the top of the strap 40 is positioned above the bottom of the steering column cover 14 when the knee airbag 16 is deployed. The cut-out portion 40K is formed in the strap 40 at the front portion or the upper portion that faces the steering column cover 14. Therefore, the cut-out portion 40K regulates the shape of the deployed knee airbag 16 so that the recessed portion 16A is formed in the front portion or the upper portion of the knee airbag 16. The recessed portion 16A formed by the cut-out portion 40K has the length in the vehicle-width direction and the width that are appropriate for suppressing the interference between the knee airbag 16 and the steering column cover 14. This reduces the influence of the steering column cover 14 when the knee airbag 16 is deployed. Also, portions of the knee airbag 16, which are positioned on both sides of the recessed portion 16A, move from below the steering column cover 14 to areas on the both sides of the steering column cover 14 in the vehicle-width direction. Thus, movement of the knee airbag 16 in the vehicle-width direction is regulated. Therefore, the position of the deployed knee airbag 16 in the vehicle-width direction is stabilized. Thus, the knee airbag 16 is stably deployed in substantially parallel with the surface 32A of the instrument panel 32.

Because the knee airbag 16 is deployed in substantially parallel with the surface 32A of the instrument panel 32, reaction force used to restrain the knee portion 20K of the occupant 20 is quickly generated at the surface 32A of the instrument panel 32, as shown in FIG. 1. This improves the performance of restraining the knee portion 20K of the occupant 20.

In the above-described embodiment, the two straps 40 and 42 are provided. However, three or more straps may be provided.

What is claimed is:

1. A knee airbag device comprising
    a knee airbag that is disposed in a folded state inside a steering column cover, wherein:
    when the knee airbag receives gas, the knee airbag is inflated and deployed from an inside of the steering column cover toward a knee portion of an occupant;
    the knee airbag includes an instrument panel-side foundation cloth positioned close to an instrument panel when the knee airbag is deployed, an occupant-side foundation cloth positioned close to the occupant when the knee airbag is deployed, and a first strap and a second strap, which extend in a vehicle-width direction, that connect the instrument panel-side foundation cloth and the occupant-side foundation cloth;
    the first strap is positioned above the second strap in a vehicle-height direction when the knee airbag is deployed;
    a length of the first strap in a vehicle-longitudinal direction is set to be larger than a length of the second strap in the vehicle-longitudinal direction when the knee airbag is deployed;
    a length of the first strap in the vehicle-width direction is larger than a length of the steering column cover in the vehicle-width direction; and
    a cut-out portion is formed in the first strap at a position that faces the steering column cover.

2. The knee airbag device according to claim 1, wherein the difference between the length of the first strap in the vehicle-longitudinal direction and the length of the second strap in the vehicle-longitudinal direction increases with an increase in an angle formed between a surface of the instrument panel, which is positioned in front of the knee of the occupant, and an axis of the steering column in the lateral view of the vehicle.

* * * * *